United States Patent
Steele et al.

(10) Patent No.: US 8,517,760 B2
(45) Date of Patent: *Aug. 27, 2013

(54) CORD WRAP AND POWER PLUG RECEPTACLE ARRANGEMENT FOR INFLATOR

(75) Inventors: Kimberly Ann Steele, Northville, MI (US); Darryl L. Jones, Southfield, MI (US); Yingchao Guan, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/714,769

(22) Filed: Mar. 1, 2010

(65) Prior Publication Data
US 2011/0094620 A9    Apr. 28, 2011

Related U.S. Application Data

(63) Continuation of application No. 12/179,982, filed on Jul. 25, 2008, now Pat. No. 7,695,312, and a continuation of application No. 11/894,390, filed on Aug. 20, 2007, and a continuation of application No. 11/852,275, filed on Sep. 8, 2007, and a continuation of application No. 12/023,542, filed on Jan. 31, 2008.

(51) Int. Cl.
*H01R 13/72* (2006.01)

(52) U.S. Cl.
USPC ............................. 439/501; 439/528; 141/38

(58) Field of Classification Search
USPC ................... 439/501, 528; 141/38
See application file for complete search history.

(56) References Cited

U.S. PATENT DOCUMENTS

| D286,782 S | 11/1986 | Somers |
| 4,658,465 A | 4/1987 | Keane et al. |
| 4,756,697 A | 7/1988 | Hefling |
| D301,887 S | 6/1989 | Price et al. |
| 5,442,669 A | 8/1995 | Medin |
| 5,455,735 A | 10/1995 | Zerega |

(Continued)

FOREIGN PATENT DOCUMENTS

| CN | 101372196 A | 2/2009 |
| CN | 101372197 A | 2/2009 |

(Continued)

OTHER PUBLICATIONS

U.S. Reexamination No. 95/000,581, for Patent No. 7,695,312, entitled "Cord Wrap and Power Plug Receptacle Arrangement for Inflator."

(Continued)

*Primary Examiner* — Tho D Ta
(74) *Attorney, Agent, or Firm* — O'Brien Jones PLLC; Raymond L. Coppiellie

(57) ABSTRACT

A temporary mobility kit to minimize or prevent the inadvertent outflow of tire sealant is provided. The temporary mobility kit includes a switch-inflator assembly and a removable sealant assembly. The switch-inflator assembly includes a pump motor and an electrical plug assembly having a cord portion and a plug. The plug is adapted for use in the vehicle's power unit. The housing includes a peripheral channel about which the cord portion of the electrical plug assembly is wrapped when the electrical plug assembly is not in use. A plug-receiving aperture is provided to receive and retain the plug when not in use.

18 Claims, 2 Drawing Sheets

(56) References Cited

U.S. PATENT DOCUMENTS

| | | | |
|---|---|---|---|
| 5,705,977 A | 1/1998 | Jones | |
| 5,721,527 A | 2/1998 | Simmons et al. | |
| 5,908,145 A | 6/1999 | Jaksa | |
| 5,910,931 A | 6/1999 | Pettyjohn | |
| 5,941,577 A | 8/1999 | Musellec | |
| 6,092,569 A | 7/2000 | Simmel et al. | |
| 6,283,172 B1 | 9/2001 | Thurner | |
| 6,301,901 B1 | 10/2001 | Coffee et al. | |
| 6,428,348 B1 | 8/2002 | Bean | |
| 6,431,225 B1 | 8/2002 | Dudley | |
| 6,445,967 B1 | 9/2002 | Travagline et al. | |
| 6,490,543 B1 | 12/2002 | Jaw | |
| 6,501,390 B1 | 12/2002 | Chainer et al. | |
| 6,618,261 B1 | 9/2003 | Gaboury et al. | |
| 6,668,875 B2 | 12/2003 | Kojima et al. | |
| 6,736,170 B2 | 5/2004 | Eriksen et al. | |
| 6,766,834 B1 | 7/2004 | Eckhardt | |
| 6,784,794 B1 | 8/2004 | McQuade | |
| 6,789,581 B2 | 9/2004 | Cowan et al. | |
| 6,795,376 B2 | 9/2004 | Quine | |
| 6,812,825 B1 | 11/2004 | Volk | |
| 6,829,520 B1 | 12/2004 | Green | |
| 6,904,932 B1 | 6/2005 | Haraughty | |
| 6,922,154 B2 | 7/2005 | Kraljic et al. | |
| 6,938,651 B1 | 9/2005 | Carter et al. | |
| 6,964,284 B2 | 11/2005 | Eckhardt | |
| 6,985,076 B1 | 1/2006 | Bennie et al. | |
| 6,985,408 B2 | 1/2006 | Quine | |
| 7,026,922 B1 | 4/2006 | Talukder et al. | |
| 7,092,804 B2 | 8/2006 | McQuade et al. | |
| 7,118,017 B1 | 10/2006 | Geraghty et al. | |
| 7,289,016 B2 | 10/2007 | Luebke et al. | |
| D557,299 S * | 12/2007 | Marini et al. | D15/199 |
| D613,320 S | 4/2010 | Marini | |
| 7,694,698 B2 | 4/2010 | Marini | |
| 7,695,312 B2 * | 4/2010 | Steele et al. | 439/501 |
| 7,789,110 B2 | 9/2010 | Marini | |
| 7,798,183 B2 | 9/2010 | Cegelski et al. | |
| 7,828,336 B2 | 11/2010 | Gammons | |
| 7,878,360 B2 | 2/2011 | Takeda | |
| 8,115,615 B2 | 2/2012 | Miller et al. | |
| 8,146,622 B2 | 4/2012 | Guan et al. | |
| 8,181,676 B2 | 5/2012 | Steele et al. | |
| 8,251,105 B2 | 8/2012 | Lolli et al. | |
| 8,276,624 B2 | 10/2012 | Steele et al. | |
| 2001/0017134 A1 | 8/2001 | Bahr | |
| 2003/0047652 A1 | 3/2003 | Eckhardt | |
| 2004/0159365 A1 | 8/2004 | Cowan et al. | |
| 2005/0191193 A1 | 9/2005 | Chou | |
| 2005/0284536 A1 | 12/2005 | Kojima et al. | |
| 2005/0284980 A1 | 12/2005 | Chang | |
| 2006/0021472 A1 | 2/2006 | Ragan et al. | |
| 2007/0113369 A1 | 5/2007 | Cochran et al. | |
| 2007/0181209 A1 | 8/2007 | Stehle | |
| 2008/0060734 A1 | 3/2008 | Stehle | |
| 2008/0277044 A1 | 11/2008 | Marini | |
| 2009/0050232 A1 * | 2/2009 | Guan et al. | 141/38 |
| 2009/0066487 A1 | 3/2009 | Miller et al. | |
| 2009/0107578 A1 | 4/2009 | Trachtenberg et al. | |
| 2009/0193937 A1 | 8/2009 | Steele et al. | |
| 2009/0266440 A1 | 10/2009 | Lolli et al. | |
| 2009/0301602 A1 | 12/2009 | Lolli et al. | |
| 2010/0005930 A1 | 1/2010 | Lolli et al. | |

FOREIGN PATENT DOCUMENTS

| | | |
|---|---|---|
| CN | 101380877 A | 3/2009 |
| CN | 101497247 A | 8/2009 |
| DE | 4305172 A1 | 2/1993 |
| DE | 19527894 A1 | 1/1997 |
| DE | 19709445 A1 | 9/1998 |
| DE | 102008028926 A1 | 2/2009 |
| DE | 102008026726 A1 | 3/2009 |
| DE | 102009005849 A1 | 5/2009 |
| EM | 178983 | 8/2004 |
| EM | 656798 | 2/2007 |
| EP | 000535034-0001 | 7/2006 |
| EP | 1747878 A1 | 1/2007 |
| GB | 2331053 A | 12/1999 |
| GB | 2452137 A | 2/2009 |
| GB | 2452601 A | 3/2009 |
| JP | 2000238144 A | 9/2000 |
| JP | 2001212883 A | 8/2001 |
| WO | WO 2005/085028 | 9/2005 |
| WO | WO 2006/024534 | 3/2006 |
| WO | WO-2007102066 A2 | 9/2007 |
| WO | WO 2008/001179 | 1/2008 |
| WO | WO- 2008035163 A2 | 3/2008 |
| WO | WO 2009/019590 A2 | 2/2009 |
| WO | WO 2009/027792 A1 | 3/2009 |
| WO | WO 2009/156817 A1 | 12/2009 |

OTHER PUBLICATIONS

Documents from U.S. Reexamination No. 95/000,581, for Patent No. 7,695,312, entitled "Cord Wrap and Power Plug Receptacle Arrangement for Inflator", Jan. 20, 2012.

Office Action dated Jan. 20, 2011 in U.S. Reexamination No. 95/000,581, for Patent No. 7,695,312, entitled "Cord Wrap and Power Plug Receptacle Arrangement for Inflator."

Applicant response to Office Action dated Jan. 20, 2011 in U.S. Reexamination No. 95/000,581, for Patent No. 7,695,312, entitled "Cord Wrap and Power Plug Receptacle Arrangment for Inflator," including enclosed declarations.

Requester response to Office Action dated Jan. 20, 2011 in U.S. Reexamination No. 95/000,581, for Patent No. 7695,312, entitled "Cord Wrap and Power Plug receptacle Arrangement for Inflator," including enclosed declarations.

Owner Appeal Brief in U.S. Reexamination No. 95/000,581, for Patent No. 7,695,312, entitled "Cord Wrap and Power Plug Receptacle Arrangement for inflator," Apr. 17, 2012.

Owner Rebuttal Brief in U.S. Reexamination No. 95/000,581, for Patent No. 7,695,312, entitled "Cord Wrap and Power Plug Receptacle Arrangement for Inflator," including enclosed declarations, May 2, 2012.

Examiner's Answer in U.S. Reexamination No. 95/000,581, for Patent No. 7,695,312, entitled "Cord Wrap and Power Plug Receptacle Arrangement for Inflator." Aug. 27, 2012.

Requester Rebuttal Brief in U.S. Reexamination No. 95/000,581, for Patent No. 7,695,312, entitled "Cord Wrap and Power Plug Receptacle Arrangement for Inflator," Apr. 21, 2011.

English Translation of JP2000-238144A.

English Translation of JP2001-212883A.

Letter from John Richards dated Jun. 28, 2010.

Paul Williams, "Product Review: AirMan Tire Repair System", Canadian Driver, Oct. 15, 2004, 3 pages.

Stop & Go International, "Tire Mobility Kit" product details, 1998, 2 pages, www.stopngo.com/Contents/5000.asp.

Mona, "Fix-A-Flat: Spare Yourself Some Grief", www.epinions. netcontent_254719790724, Sep. 15, 2006, 4 pages.

Office Action dated Jul. 2, 2009 from U.S. Appl. No. 12/179,982, now Patent No. 7,695,312.

Office Action dated Apr. 7, 2011 from U.S. Appl. No. 11/852,275, now Patent No. 8,115,615.

Office action dated Feb. 18, 2011 from U.S. Appl. No. 11/894,390, now patent No. 8,146,622.

Office action dated Sep. 20, 2011 form U.S. Appl. No. 11/894,390, now Patent No. 8,146,622.

Office Action dated Aug. 2, 2011 from U.S. Appl. No. 12/023,542, now Patent No. 8,276,624.

Office Action dated Feb. 15, 2012 from U.S. Appl. No. 12/023,542, now Patent No. 8,276,624.

Office Action dated Apr. 10, 2012 from U.S. Appl. No. 12/023,542, now Patent No. 8,276,624.

Amendment after Final dated Jun. 27, 2012 form U.S. Appl. No. 12/023,542, now Patent No. 8,276,624.

Office Action dated Feb. 22, 2011 from U.S. Appl. No. 12/963,628, now Patent No. 8,181,676.

Office Action dated Sep. 20, 2011 from U.S. Appl. No. 12/963,628, now Patent No. 8,181,676.

Office Action dated Apr. 25, 2011 from U.S. Appl. No. 13/415,652.
Office Action dated Sep. 26, 2012 from U.S. Appl. No. 13/415,652.
Reply to Office Action dated Jul. 2, 2009 from U.S. Appl. No. 12/179,982, now Patent No. 7,695,312.
Reply to Office Action dated Apr. 7, 2011 from U.S. Appl. No. 11/852,275, now Patent No. 8,115,615.
Reply to Office Action dated Feb. 18, 2011 from U.S. Appl. No. 11/894,390, now Patent No. 8,146,622.
Reply to Office Action dated Sep. 20, 2011 from U.S. Appl. No. 11/894,390, now Patent No. 8,146,622.
Reply to Office Action dated Aug. 2, 2011 from U.S. Appl. No. 12/023,542, now Patent No. 8,276,624.
Reply to Office Action dated Feb. 15, 2012 from U.S. Appl. No. 12/023,542, now Patent No. 8,276,624.
Reply to Office Action dated Apr. 10, 2011 from U.S. Appl. No. 12/023,542, now Patent No. 8,276,624.
Reply to Office Action dated Feb. 22, 2011 from U.S. Appl. No. 12/963,268, now Patent No. 8,181,676.
Reply to Office Action dated Sep. 20, 2011 from U.S. Appl. No. 12/963,628, now Patent No. 8,181,676.
Reply to Office Action dated Apr. 25, 2011 from U.S. Appl. No. 13/415,652.
Reply to Office Action dated Sep. 26, 2012 from U.S. Appl. No. 13/415,652.
Inter Partes request dated Dec. 9, 2010 from 95/000,581.
Determination that Reexam Ordered dated Jan. 12, 2011 from 95/000,581.
Inter Partes request dated Sep. 14, 2012 from 95/000,692.
Response dated Jan. 4, 2013 from 95/000,692.
Reexam Office Action dated Nov. 8, 2012 from 95/000,692.
Determination that Reexam Ordered dated Nov. 8, 2012 from 95/000,692.
Third Party Requester comments dared Feb. 2, 2013 from 95/000,692.
Letter from John Richards dated May 31, 2012.
English translation of Japanese Unexamined Patent Publication (Kokai) No. 2000-238144, Sep. 5, 2000.
English translation of Japanese Unexamined Patent Publication (Kokai) No. 2001-212833, Aug. 7, 2001.
Author Unknown, "Notes on the safe use of the ContiComfort Kit," www.conticomfortkit.co.uk, Jul. 2007.
Author Unknown, TEK 2005 Product Literature, Nov. 2005.

* cited by examiner

CORD WRAP AND POWER PLUG RECEPTACLE ARRANGEMENT FOR INFLATOR

This is a continuation of U.S. Pat. No. 7,695,312, filed Jul. 25, 2008, the entire disclosure of which is incorporated herein by reference, U.S. patent application Ser. No. 11/894,390, filed Aug. 20, 2007, U.S. patent application Ser. No. 11/852,275, filed Sep. 8, 2007, and U.S. patent application Ser. No. 12/023,542, filed Jan. 31, 2008.

TECHNICAL FIELD

The present invention relates generally to portable inflator units for vehicle tires. More particularly, the present invention relates to a cord wrap and power plug receptacle arrangement for a portable inflator unit for inflating a vehicle tire.

BACKGROUND OF THE INVENTION

Automotive manufacturers have traditionally offered spare tires with the fleet of vehicles they produce. In the early days of automobiles the spare tire was mounted externally on either the running board or on a rear-mounted tire carrier. To comply with advances in styling the spare tire was concealed, most typically being moved inside the vehicle's trunk. While this arrangement provided a suitable solution for placement of the spare tire for decades, the demand for increased space for luggage and the like coupled with changes in fuel economy requirements dictating the need for vehicle weight reduction forced manufacturers to consider the vehicle anew in its entirety as they sought ways to increase trunk space and reduce vehicle weight. One answer to the effort to reduce overall vehicle weight was to replace the conventional, large and bulky road tire with a smaller temporary tire or "donut."

While the temporary tire represented a significant increase in trunk space as well as a decrease in overall vehicle weight, the further improvement in tire design and durability as well as the concurrent general improvement in roadways has gradually begun to reduce the need for relying on a spare tire at all. Today the on-the-road emergency changing of a tire is a relatively rare event. It is now very possible for a spare tire to last the life of the vehicle without ever being replaced, although this is certainly not the preferred practice.

In response to these advances in both tire technology and road quality, vehicle auto manufacturers have begun to substitute a "temporary mobility kit" (or "TMK") for the spare tire. The TMK includes a dual-purpose air compressor and a sealing system. The sealing system includes a sealing compound that will effectively seal most punctures caused by nails or similar objects. The air compressor drives the sealing compound into the compromised tire and, subsequently, can be used to reinflate the tire once the sealing compound has been introduced into the tire and the leak has been sealed. The growing trend today is for manufacturers to equip the vehicle with a temporary mobility kit in lieu of the spare tire, often locating the TMK in the spare tire well in the trunk.

One of the difficulties of known temporary mobility kits is the inconvenience and impracticality of arrangements for storing the cord and for maintaining the plug in a convenient place when the unit is not in use. Today it is known to provide a space in which both the cord and the power plug can be inserted or a space for the power plug alone. Typically these spaces are very small and work well only when the temporary mobility kit is new from the factory and has not yet been used. Once the TMK has been used, it is challenging for the average user to refit the cord and the plug into the small space.

While providing clear advantages over the weight demands of the spare tire as well as providing the vehicle operator with a practical alternative over the demands of tire changing, as in most every area of vehicle technology temporary mobility kits are in a continuing state of development.

SUMMARY OF THE INVENTION

The present invention provides a temporary mobility kit having a convenient and practical way of readily storing both the power cord and the power plug between uses. The temporary mobility kit disclosed herein includes a switch-inflator assembly and an interchangeable sealant assembly. The interchangeable sealant assembly includes a canister which can be replaced once used. The switch-inflator assembly has an housing. The power plug is attached to the power cord and the power cored is attached to the switch-inflator assembly. A peripheral power cord-accommodating channel and a power plug-accommodating hole are formed in the upper portion of the housing of the switch-inflator assembly. The power cord is stored in the power cord-accommodating channel and the power plug is stored in the power plug-accommodating hole during periods of non-use.

To use the power cord and the associated power plug of the temporary mobility kit the power plug is withdrawn from the plug-accommodating hole and the cord is removed from cord-accommodating channel by unwrapping. After use of the temporary mobility kit the user can readily wrap the cord into the cord-accommodating channel followed by the insertion of the power plug into the plug-accommodating hole. With the power plug fitted to the plug-accommodating hole an amount of tension is applied to the power cord such that the power cord is retained in the cord-accommodating channel without becoming loose.

Other features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiment illustrated in greater detail in the accompanying drawings and described below by way of examples of the invention wherein.

DETAILED DESCRIPTION OF THE PREFERRED EMBODIMENT

Figure 1:
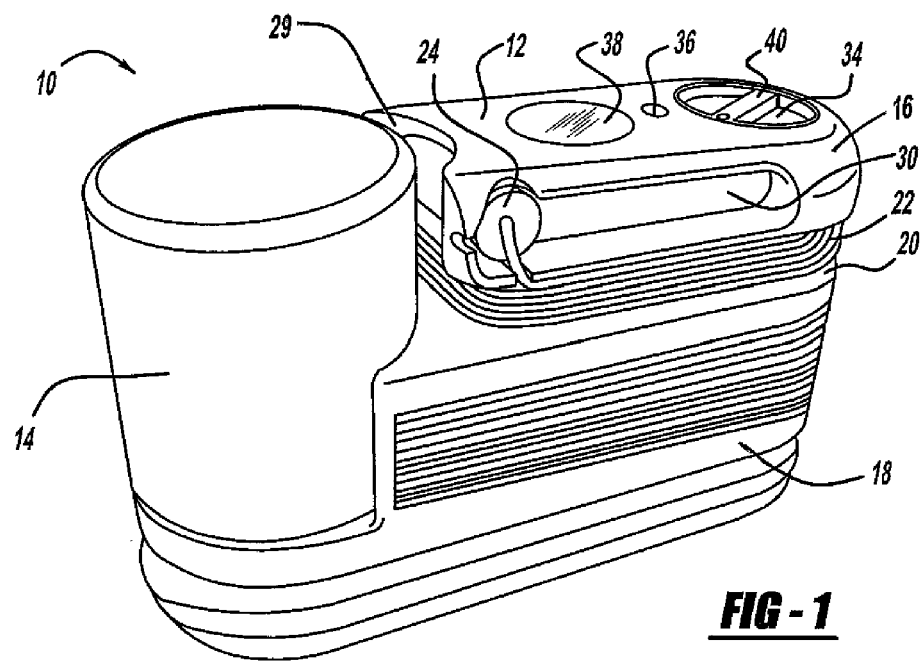
FIG. 1 illustrates a perspective view of the temporary mobility kit of the disclosed invention showing the power cord and the power plug in their stored conditions.

In the following figures, the same reference numerals will be used to refer to the same components. In the following description, various operating parameters and components are described for one constructed embodiment. These specific parameters and components are included as examples and are not meant to be limiting.

Figure 2:
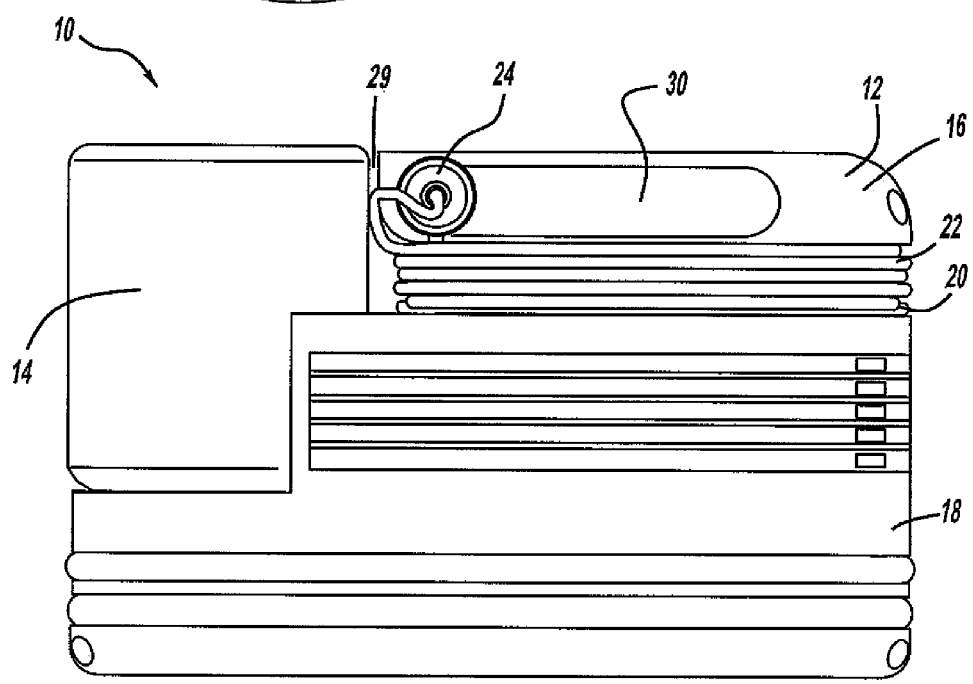
FIG. 2 is a side view of the temporary mobility kit of FIG. 1 also showing the power cord and the power plug in their stored conditions.

Referring to the drawings and in particular to FIGS. 1 and 2, a perspective view and a side view of a temporary mobility kit, generally illustrated as 10, are respectively shown. The temporary mobility kit 10 includes a switch-inflator assembly 12 and a sealant assembly 14. While preferably being a one-piece part, the switch-inflator assembly 12 includes an upper portion 16 and a lower portion 18.

The temporary mobility kit 10 includes an electrical plug assembly 20 having a cord portion 22 and a plug 24. The plug 24 is adapted for use in the vehicle's power unit (not shown). Formed between the upper portion 16 and the lower portion 18 is a peripheral channel 26 about which the cord portion 22 of the electrical plug assembly 24 is wrapped when the electrical plug assembly 24 is not in use. A plug-receiving aperture 28 is provided to receive and retain the plug 24 when the temporary mobility kit 10 is not in use. The peripheral channel 26 and the plug-receiving aperture 28 are more clearly seen in FIG. 3. The plug-receiving aperture 28 is shown in partial broken lines in FIG. 4 in which it is clearly seen that the aperture 28 for the plug 26 is defined in the housing in a transverse, cross-wise manner. Other arrangements for the aperture 28 are possible, and the illustrated transverse arrangement is suggested and is not intended to be limiting.

Figure 3:
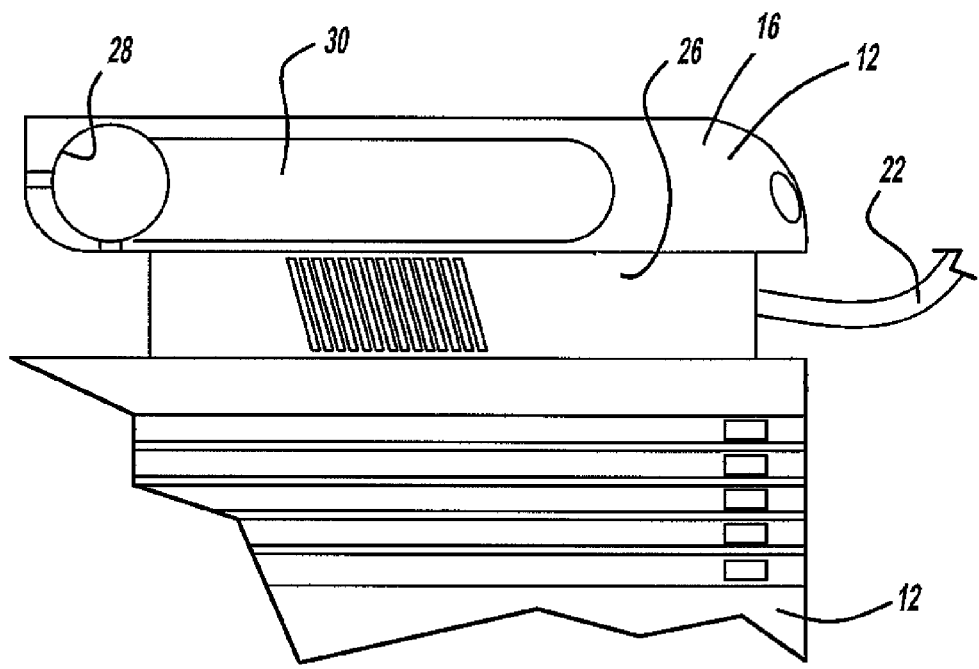
FIG. 3 is a close-up view of the upper portion of the switch-inflator assembly in which the peripheral cord-accommodating channel and the plug-accommodating hole of the temporary mobility kit are illustrated.

As illustrated in FIGS. 1, 2 and 3, a gap 29 is defined between the upper portion 16 and the sealant assembly 14. The gap 29 allows the cord portion 22 to be wrapped in the peripheral channel 26.

Figure 4:
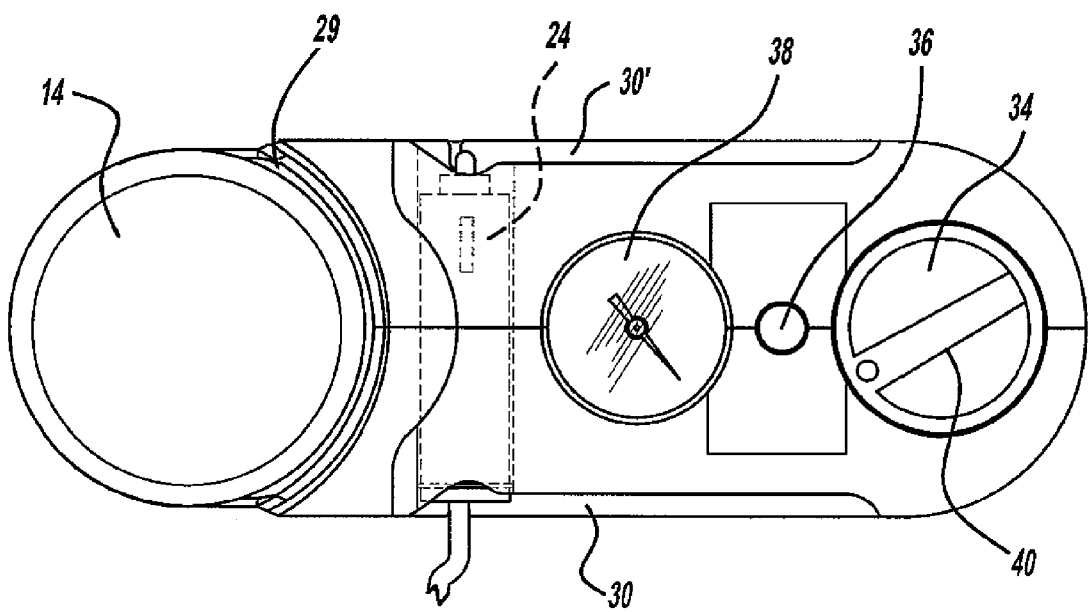
FIG. 4 is a top view of the temporary mobility kit illustrating particularly the plug-accommodating hole shown in broken lines.

A pair of opposed recessed areas defined by a first recessed area 30 and a second recessed area 30' is defined on the opposite sides of the upper area 16 of the switch-inflator assembly 12. The opposed recessed areas 30 and 30' are provided to allow for the user to readily grasp and lift the temporary mobility kit 10. As illustrated in FIG. 4, the plug-receiving aperture 24 is preferably continuous between the first recessed area 30 and the second recessed area 30'.

The switch-inflator assembly 12 also includes a diverter switch 34, a power-on, power-off button 36, and an air pressure gauge 38. The power-on, power-off button 36 may be of a variety of types but is preferably a momentary switch. Placement of these components as set forth is only suggestive and is not to be taken as being limiting. However, with each of these components being positioned on the top of the switch-inflator assembly 12 they are within easy reach of the user and also provide an easy view of the operating condition of the temporary mobility kit 10 in its relation to the tire.

The diverter switch 34 includes a knob 40. The diverter switch 34 may also be characterized as a function switch. The diverter switch 34 provides the temporary mobility kit 10 with a way of allowing the user to select between the sealant function and the air inflation function. The selection arrangement presented herein allows only one function to be enabled at a time. The knob 40 may be rotated between an air inflation position and a sealant function position.

The power-on, power-off button 36 operates to engage or disengage the temporary mobility kit 10. The air pressure gauge 38 provides the user with information as to the amount of air pressure in the subject tire in real time.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A portable apparatus for sealing and inflating a tire, the apparatus comprising:
   a switch-inflator assembly having an upper portion and a lower portion;
   a sealant portion releasably attached to the switch-inflator assembly;
   a peripheral channel defined between the upper portion and the lower portion of the switch-inflator assembly;
   a cord passage gap defined between the sealant portion and the switch-inflator assembly, the cord passage gap adjoining the peripheral channel where the peripheral channel faces the sealant portion; and
   a cord and plug assembly connected to the switch-inflator assembly,
   wherein the cord and plug assembly is wrapped around the switch-inflator assembly by passage of the cord and plug assembly through the cord passage gap to the peripheral channel.

2. The portable apparatus of claim 1, further including a plug-receiving recess formed in the switch-inflator assembly.

3. The portable apparatus of claim 1, wherein the sealant portion comprises a canister.

4. The portable apparatus of claim 1, wherein the upper portion includes handle-defining recessed regions.

5. The portable apparatus of claim 4, wherein the plug-receiving recess is formed between the handle-defining recessed regions.

6. A temporary mobility kit configured to seal and fill a tire, the temporary mobility kit comprising:
   a sealant portion;
   a switch-inflator assembly connected to the sealant portion, the switch-inflator assembly comprising a housing, an inflator pump, and a cord assembly including a cord and a plug, the housing comprising a recess for accommodating the plug and a channel surrounding the housing and accommodating the cord so that the cord can be stored in the channel,
   wherein a proximal end of the cord assembly is attached to the housing of the switch-inflator assembly in or adjacent to the channel and the cord is stored in the channel surrounding the switch-inflator assembly housing by being wound around the housing and through a gap defined between the sealant portion and the switch-inflator assembly.

7. The temporary mobility kit of claim 6, wherein the sealant portion is removably attached to the switch-inflator assembly.

8. The temporary mobility kit of claim 6, wherein the sealant portion is spaced apart from the upper portion of the housing to define the gap through which the cord can pass to be wound around the housing.

9. The temporary mobility kit of claim 6, wherein the sealant portion comprises a canister.

10. The temporary mobility kit of claim 6, wherein the gap adjoins the channel where the channel faces the sealant portion.

11. The temporary mobility kit of claim 6, wherein the housing has an upper portion and a lower portion, and the channel is formed between the upper portion and the lower portion.

12. The temporary mobility kit of claim 11, wherein the upper portion includes handle-defining recessed regions.

13. The temporary mobility kit of claim 12, wherein a recess for accommodating the plug is formed between the handle-defining recessed regions.

14. A method for storing a portable tire repair apparatus comprising a power cord assembly connected to a switch-inflator assembly and a sealant portion removably attached to the switch-inflator assembly, the switch-inflator assembly including a housing having a plug recess and a peripheral channel surrounding the housing, the method comprising:
   winding the power cord assembly through a gap defined between the sealant portion and the switch-inflator assembly and into the peripheral channel of the switch-inflator assembly housing; and
   inserting a plug of the power cord assembly into the plug recess.

15. The method of claim 14, wherein the sealant portion is spaced apart from the upper portion of the housing to define the gap.

16. The method of claim 14, wherein the sealant portion comprises a canister.

17. The method of claim 14, wherein the housing comprises handle-defining recessed regions and the method comprises moving the portable tire repair apparatus by grasping the handle-defining recessed regions.

18. The method of claim 17, wherein the plug recess is formed between the handle-defining recessed regions.

* * * * *